(12) United States Patent
Bhattacharjee et al.

(10) Patent No.: US 7,726,727 B2
(45) Date of Patent: Jun. 1, 2010

(54) LEG PUSHER DEVICE FOR SIDE IMPACT TESTS

(75) Inventors: Sudip Bhattacharjee, Lasalle (CA); Abdelmonaam Sassi, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/116,421

(22) Filed: May 7, 2008

(65) Prior Publication Data

US 2009/0278380 A1 Nov. 12, 2009

(51) Int. Cl.
*B60J 7/00* (2006.01)
(52) U.S. Cl. .............................. 296/187.12; 296/146.6; 296/187.05
(58) Field of Classification Search ............ 296/187.12, 296/187.05, 146.6, 146.5
See application file for complete search history.

(56) References Cited

U.S. PATENT DOCUMENTS

| 5,306,066 | A | 4/1994 | Saathoff |
| 5,395,135 | A | 3/1995 | Lim et al. |
| 5,482,344 | A | 1/1996 | Walker et al. |
| 5,577,794 | A | 11/1996 | Gandhi et al. |
| 5,749,600 | A | 5/1998 | Yamada et al. |
| 6,543,838 | B1 | 4/2003 | Bertolini et al. |
| 6,976,728 | B2 | 12/2005 | Froeschle et al. |

*Primary Examiner*—Joseph D Pape
(74) *Attorney, Agent, or Firm*—Franklin MacKenzie; Ford Global Technologies, LLC

(57) ABSTRACT

An energy absorbing vehicle door is disclosed comprised of an inner panel, an outer panel joined to the inner panel, door trim panel material on the inner panel, and at least one energy absorbing member mounted on the inner panel. The energy absorbing member has a first surface adjacent the outer member and a second surface adjacent the door trim panel. The energy absorbing member is mounted at a position corresponding to the vicinity of the vehicle operator's lower leg to reduce dynamic motion between the occupant's femur and lower leg, thereby reducing femur distal movement response during a vehicle impact event.

8 Claims, 4 Drawing Sheets

LEG PUSHER DEVICE FOR SIDE IMPACT TESTS

BACKGROUND OF THE INVENTION

Vehicle doors are typically constructed with two or more panels attached to the door frame, including an exterior or outer panel for shielding the passenger compartment from the elements, and an inner door panel which provides structural support. A trim panel is usually fastened to the inner door panel facing the passenger compartment and shields the vehicle occupants from internal door components, such as the window, the window regulator, and the door locks. The trim panel can also provide aesthetic qualities to the interior passenger compartment as well as ergonomic features, for example, easily accessible door handles, mirror and window controls, and the like.

It has been observed that a sufficient lateral impact on anthropomorphic dummy's femur region creates a high distal moment that often exceeds the good response limit used by the Insurance Institute Highway Safety (IIHS) for the side impact safety rating of vehicles. Generally, it is thought that impact caused by door hardware on the femur is the root cause of distal moment response. Stiff door trim edge, aligned with the femur, is also thought to be a root cause of high distal moment. One solution to the high distal moment response is the elimination of the source(s) of discrete impact force on the femur, which could be the stiff edge of a recessed map pocket, or door hardware packaged behind the trim. The solution in the present application applies simultaneous impact forces on the lower leg and femur, thereby reducing the internal distal moment response. The application of additional lateral force on the lower leg accelerates the lower leg mass at the same time the femur mass is accelerated laterally. The simultaneous acceleration of femur and lower leg reduces the relative lateral dynamic motion between the femur and lower leg, and contributes to the reduction of the distal moment.

BRIEF SUMMARY OF THE INVENTION

In one embodiment, the present invention relates to an energy absorbing vehicle door, comprising an inner panel, an outer panel joined to the inner panel, a door trim panel material on said inner panel; and an energy absorbing member mounted on said inner panel; said member having a first surface adjacent said outer member and a second surface adjacent said door trim panel; said energy absorbing member mounted at a position corresponding to the vicinity of vehicle occupant's lower leg to reduce dynamic motion between said occupant's femur and lower leg, thereby reducing femur distal movement response during a vehicle said impact event. The energy absorbing member is preferably comprised of foam block, such as a 45 psi foam block, or it may be constructed of some other energy absorbing material. In vehicle doors with door beams, the energy absorbing device is preferably adjacent a door beam to deflect movement of the door beam during a side impact event. In another embodiment, the energy absorbing door may further include a second energy absorbing device mounted in the inner panel in the vicinity of an occupant's femur.

In another embodiment the present invention is related to an energy absorbing vehicle door, comprising an inner panel, an outer panel joined to the inner panel, a door trim panel mounted on said inner panel, and an energy absorbing member mounted on the inner panel wherein the energy absorbing member has a first surface adjacent the outer member and a second surface adjacent the door trim panel. The energy absorbing member is mounted so that a first portion thereof corresponds to the vicinity of a vehicle occupant's femur and a second portion thereof corresponds to the vicinity of the vehicle occupant's lower leg. During a side impact event, the energy absorbing member reduces the dynamic motion between the occupant's femur and lower leg, thereby reducing femur distal movement response during a vehicle side impact event. The energy absorbing member is a foam block that acts as a pusher device for said occupant's lower leg during vehicle side impact events. Preferably, the pusher device is a 45 psi foam block. However, any material that serves to deflect side impact force is contemplated for use with the invention.

These and other advantages will become apparent to those skilled in the automotive body arts upon a reading of the description with reference to the drawings.

DETAILED DESCRIPTION OF THE PREFERRED EMBODIMENT(S)

Figure 1:
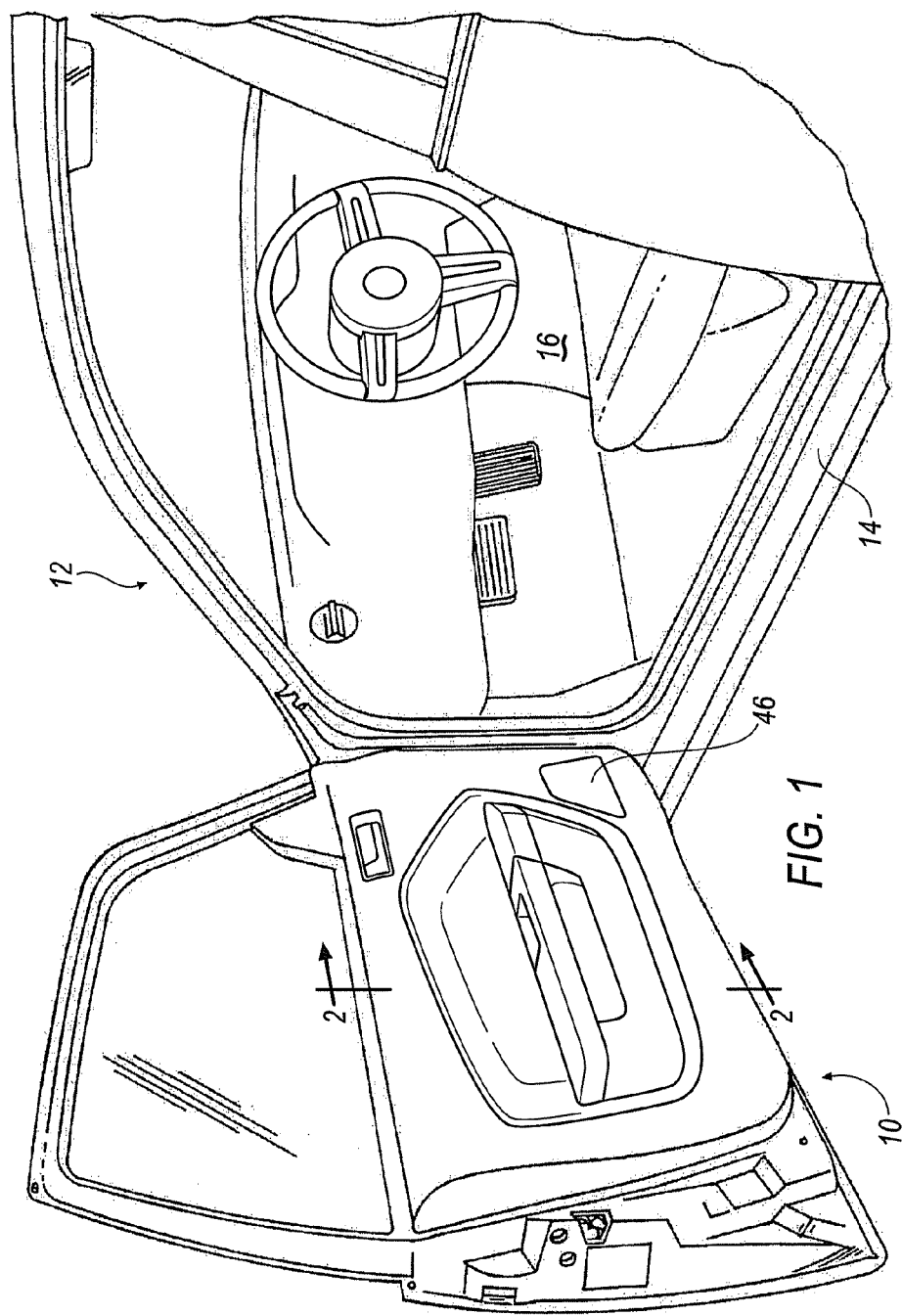
FIG. 1 is a partial perspective view of a vehicle occupant compartment bounded by an energy absorbing vehicle door according to one embodiment of present invention.

Turning now to the drawings wherein like numbers refer to like structures and in particular to FIG. 1 thereof, an energy absorbing vehicle door 10, according to the present invention, is illustrated in operational relationship with a vehicle, generally indicated at 12, such as an automotive vehicle (partially shown). More specifically, the energy absorbing vehicle door 10 is illustrated in operational relationship with a rocker panel 14 of the vehicle 12 and an occupant seating area, generally indicated at 16. It should be appreciated that the rocker panel 14 is stationary and connected to the structure of the vehicle 12 and that the vehicle door 10 is moveable and connected to the remaining structure of the vehicle 12 as is known in the art.

Figure 2:
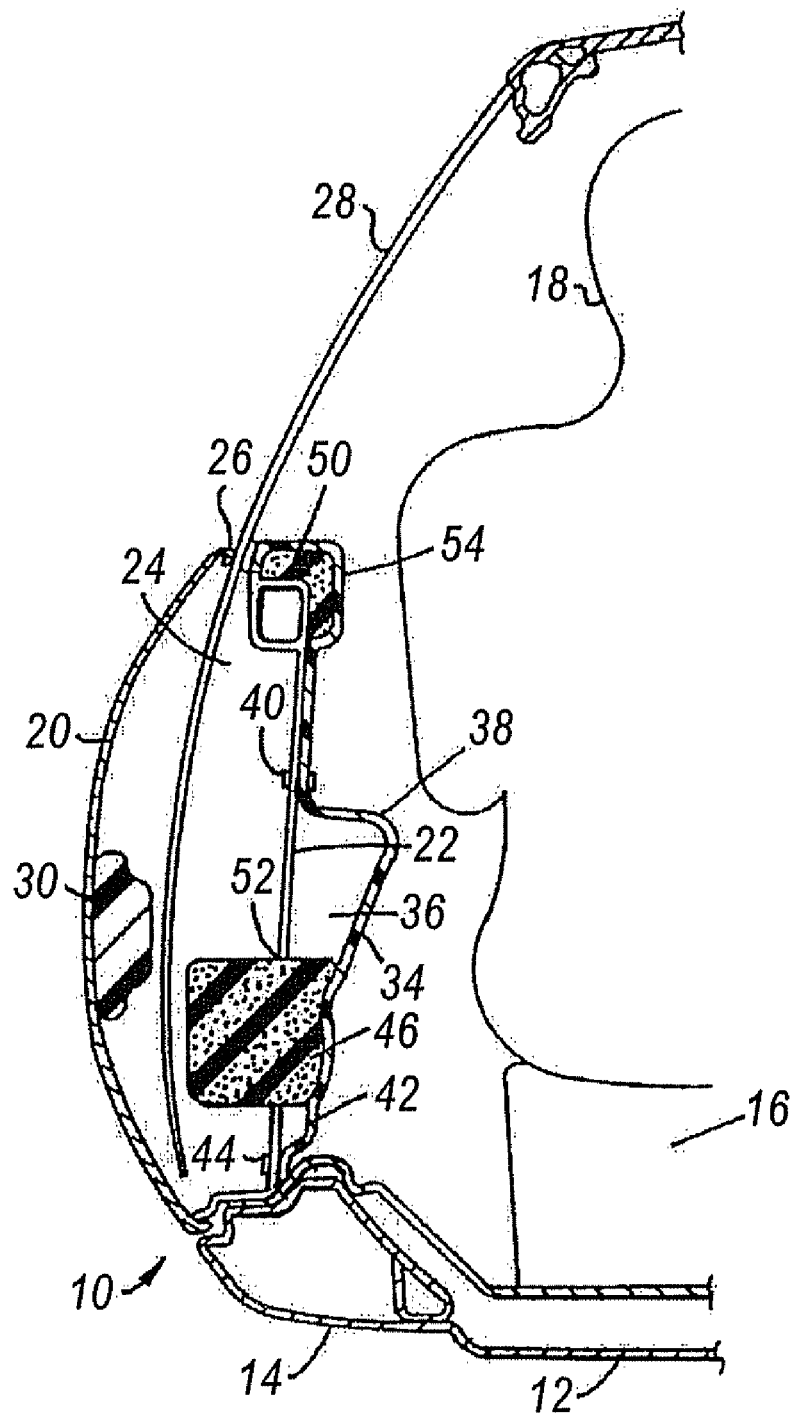
FIG. 2 is a side elevational view through a vehicle door showing the energy absorbing means and trim assembly according to one embodiment of the present invention illustrated in operational relationship with an occupant and a vehicle partially shown.

As best seen in FIG. 2, the energy absorbing vehicle door 10 includes an outer panel 20 and an inner panel, generally indicated at 22, joined together in conventional fashion to form a space 24 therebetween. Door 10 also includes an aperture 26 at an upper end for receiving a window 28, which may move in and out of the space 24. A window regulator device, a door latch, and other components of a vehicle door (not shown) as known in the art may also be housed in space 24.

The energy absorbing vehicle door 10 further includes an intrusion or door guard beam 30 secured longitudinally in the space 24 between the outer and inner panels 20, 22 by suitable means such as hem-flanging and/or welding. Alternatively, intrusion beam 30 can be secured on an exterior surface 32 of outer panel 20 by similar means.

Still referring to FIG. 2, a door trim panel 34 is mounted on the inner panel 22 to form a space 36 therebetween. The door trim panel 34 includes an arm rest 38 generally facing the occupant seating area 16. Preferably, the trim panel 34 is fixedly secured with fasteners 40, such as screws, to the inner panel 22 in the general vicinity of the arm rest 38 so that a lower portion 42 of the trim panel 34 pivots about the arm rest 38 toward the occupant seating area 16 during a side impact type collision of the vehicle door 10, as is further discussed below. Lower portion 42 of the door trim panel 34 is releasably secured to the inner panel 22 by suitable lower fasteners such as a screw and clip arrangement known in the art. The retention force of the fasteners may be chosen so that the lower portion 42 of the trim panel 34 releases when pushed with sufficient force, for example by an energy absorbing bolster 46 as described below. Other fastening means may also be used, such as Christmas tree fasteners, push pins, or other fasteners known to those skilled in the art.

Preferably, the outer panel 20 and inner panel 22 are made of a metal material or other suitable materials. The door trim panel 34 is made of a suitable material such as plastic, cardboard, wood-fiber, or a combination thereof, and may be covered with cloth, vinyl, leather, or carpeting as is known in the art.

Figure 3:
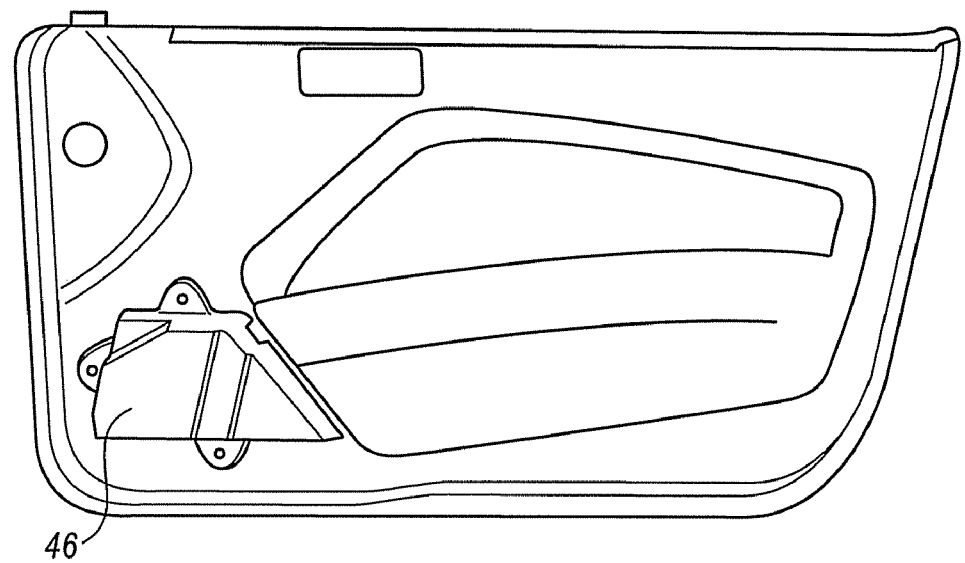
FIG. 3 is a side elevational view of the door panel, showing the energy absorbing means affixed in place according to one embodiment of the present invention.
Figure 4A:
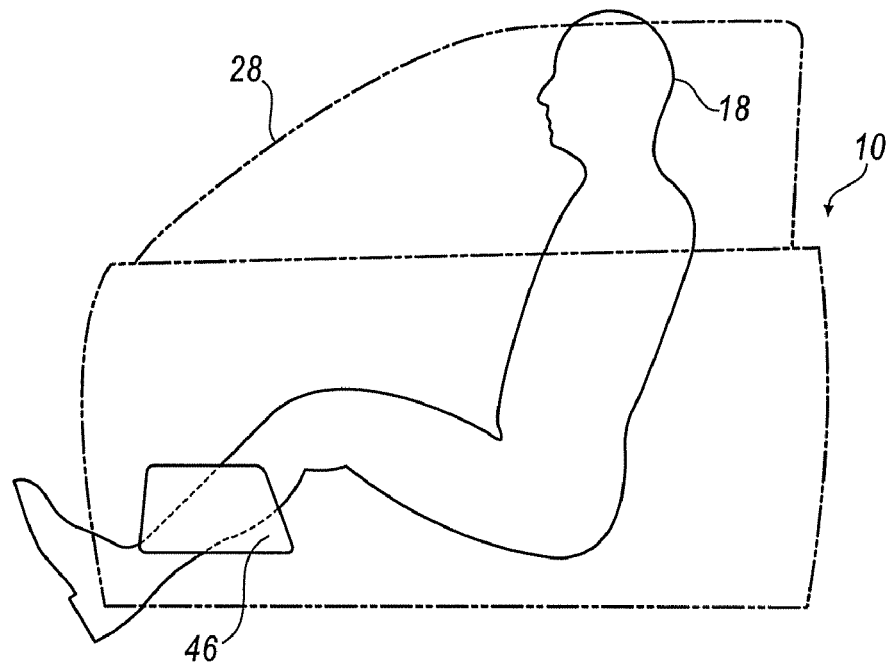
FIG. 4A is a side elevational view of an energy absorbing vehicle door, according to one embodiment of the present invention, illustrated in operational relationship with an occupant.
Figure 4B:
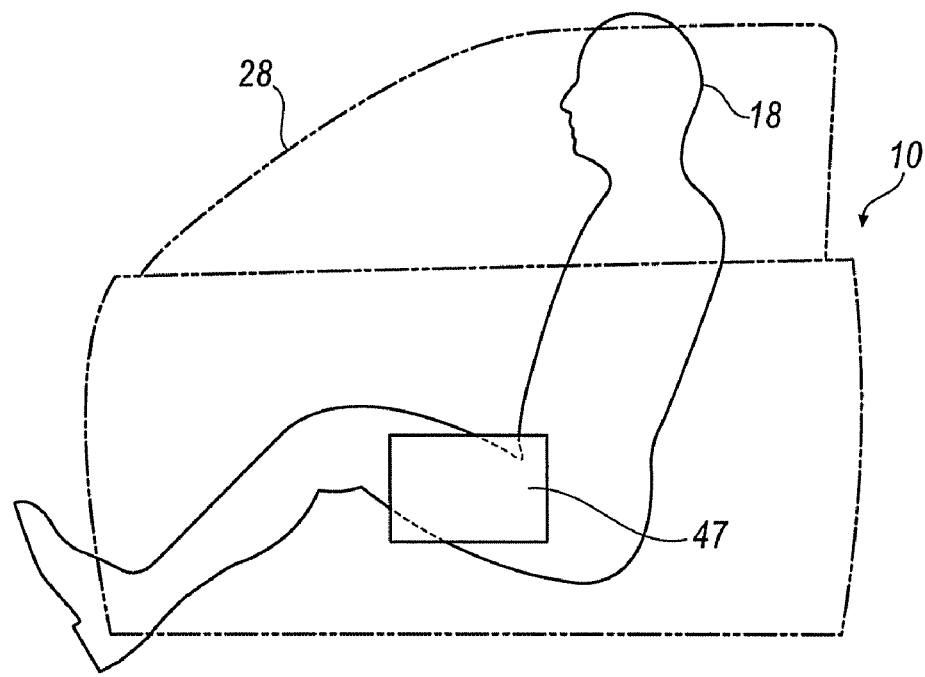
FIG. 4B is a side elevational view of an energy absorbing vehicle door, according to another embodiment, illustrated in operational relationship with an occupant.
Figure 4C:
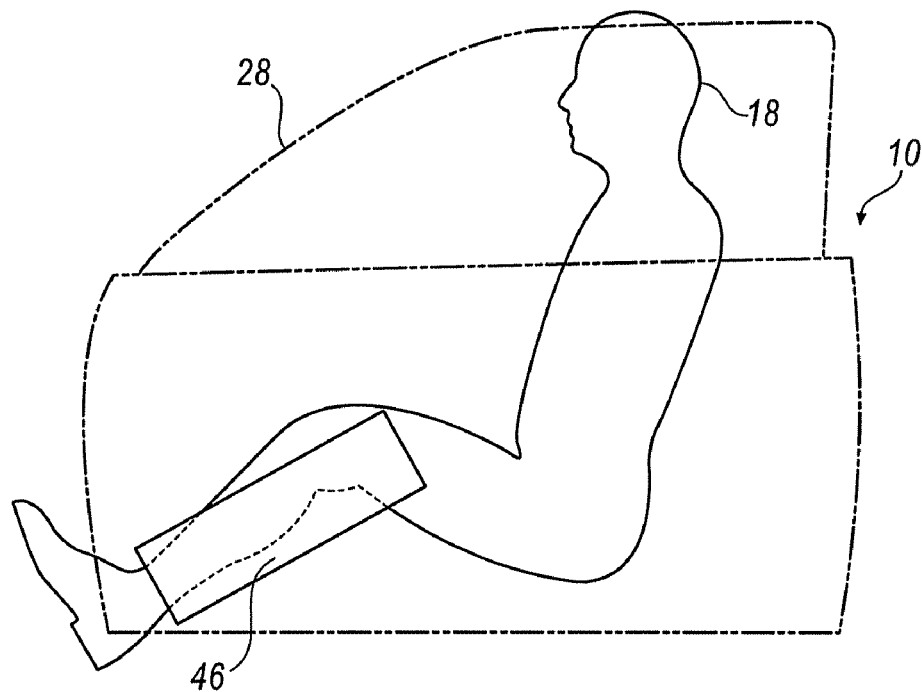

The energy absorbing vehicle door 10 further includes an energy bolster 46 as seen in FIGS. 3, 4A and 4B. The energy absorbing bolster 46 is preferably comprised of a foam material block, or a composite of such blocks, made from polyurethane foam, but may also be made of other suitable materials such as expanded beads, aluminum or paper honeycomb. The energy absorbing bolster 46 is positioned in the door at the level of an occupant's 18 distal leg portion to prevent distal movement of the femur and lower leg portion during side impact events. The energy bolster 46 is generally rectangular in shape and have predetermined crush strength large enough to withstand and transmit a side impact load to the lower portion of an occupant's leg during a side impact for the protection of the femur and lower leg regions of the occupant 18. Crush strengths between 20-45 psi are typical for the bolsters 46, and preferably the bolster has a crush strength of about 45 psi.

The energy absorbing bolster 46 may be disposed through an aperture in the inner panel 22 proximate the occupant seating area 16 at the tibia level and extending into the space 24 between the outer panel 20 and the inner panel 22, and space 36 between the inner panel 22 and the trim panel 34. The bolster 46 is mounted to the trim panel 34 by suitable means such as a urethane adhesive, for example. A second bolster 47 may be positioned in the vicinity of the occupant's femur. The bolster 46 is positioned in the lower leg area of a vehicle occupant.

In operation, the energy absorbing vehicle door 10 may be subject to a side collision type impact. When this occurs, the displacement of the outer panel 20 and intrusion beam 30 pushes the energy absorbing bolster 46 through the aperture 52 of inner panel 22. The occupant 18 while moving toward the door 10 during the impact event is cushioned by the bolster 46 which is compressed during the event. In addition, it will be noted that arm rest 38 collapses upon imposition of a load there against originating generally from the occupant seating area 16, and, in particular, from contact with occupant 16, thus providing further energy absorption. The positioning of the energy absorbing bolster at the distal portion of the occupant's leg serves to prevent distal movement of the lower leg of an occupant vis-à-vis the femur portion of the occupant's leg, thereby helping avoid strain injuries. This may be accomplished by imparting lateral movement of the lower part of the leg at the time a side impact imparts movement of the femur of an occupant. The simultaneous lateral movement of the femur and distal portion of the leg greatly reduces the relative lateral dynamic motion between the femur and lower leg, and contributes to the reduction of the distal movement.

Three vehicles without the energy absorbing bolster as described in the present specification were tested. The vehicles tested were Dodge Neon 2005, Ford Focus 2005 and Kia Spectra 2004. The test results are given in TABLE I below.

TABLE I

| MAKE | Distal Model/rear occupant | Good response limit |
|---|---|---|
|  | 3 ms clip | <254 N-m |
| Dodge Neon 2005 | 416 N-m |  |
| Ford Focus | 308 N-m |  |
| Kia Spectra | 297 N-m |  |

The energy absorbing bolster arrangement described in this application was tested in two vehicle prototypes, and the distal moment response showed significant improvement compared to a baseline where no such bolster was employed. Two vehicle prototypes were tested (tests F and G) with the proposed solution as described in this application. The test results are set forth in Table II below:

TABLE II

|  | Test A | Test B | Test C | Test D | Test E | Test F | Test G |
|---|---|---|---|---|---|---|---|
| Distal Mx (N-m) | 270.31 | 306.41 | 159.27 | 329.16 | 338.12 | 101 | 159 |
| Pelvis/Leg Rating | Acceptable | Marginal | Good | Marginal | Marginal | Good | Good |

The new design described in this specification improved the leg/pelvis rating from "Marginal" to "Good" and increased the robustness of overall IIHS side impact rating of the test vehicle.

The present invention has been described in an illustrative manner. It is to be understood that the terminology which has been used is intended to be in the nature of words of description rather than of limitation. It should be appreciated that the present invention has the same working principles applied to doors and body side panels of automotive vehicles. Although the preferred embodiments of the present invention have been disclosed, various changes and modifications may be made without departing from the scope of the invention as set forth in the appended claims.

What is claimed as new and desired to be protected by Letters Patent of the United States is:

1. An energy absorbing vehicle door, comprising:
   an inner panel;
   an outer panel joined to said inner panel;
   a door trim panel material on said inner panel; and
   an energy absorbing member mounted on said inner panel; said member having a first surface adjacent said outer member and a second surface adjacent said door trim panel; said energy absorbing member mounted at a position corresponding to the vicinity of vehicle occupant's lower leg to reduce dynamic motion between said occupant's femur and lower leg, thereby reducing said femur distal movement response during a vehicle impact event.

2. The vehicle door of claim 1, wherein said energy absorbing member is a pusher device comprised of foam block.

3. The vehicle door of claim 2, wherein said pusher device is a 45 psi foam block.

4. The vehicle door of claim 1, wherein said energy absorbing device is adjacent a door beam to deflect movement of the door beam during a side impact event.

5. The vehicle door of claim 1, further including a second energy absorbing device mounted in said inner panel in the vicinity of said occupant's femur.

6. An energy absorbing vehicle door, comprising:
   an inner panel;
   an outer panel joined to said inner panel;
   a door trim panel mounted on said inner panel; and
   an energy absorbing member mounted on said inner panel; said member having a first surface adjacent said outer member and a second surface adjacent said door trim panel; said energy absorbing member mounted so that a first portion thereof corresponding to the vicinity of a vehicle occupant's femur and a second portion thereof corresponding to the vicinity of said vehicle occupant's lower leg; said energy absorbing member to reduce dynamic motion between said occupant's femur and lower leg; thereby reducing said femur distal movement response during a vehicle impact event.

7. The vehicle door of claim 6, wherein said energy absorbing member is a foam block that acts as a pusher device for said occupant's lower leg during vehicle side impact events.

8. The energy absorbing devices of claim 7, wherein said pusher device is a 45 psi foam block.

* * * * *